Sept. 11, 1923.
H. J. COOPER
CLAMP
Filed April 21, 1919
1,467,708
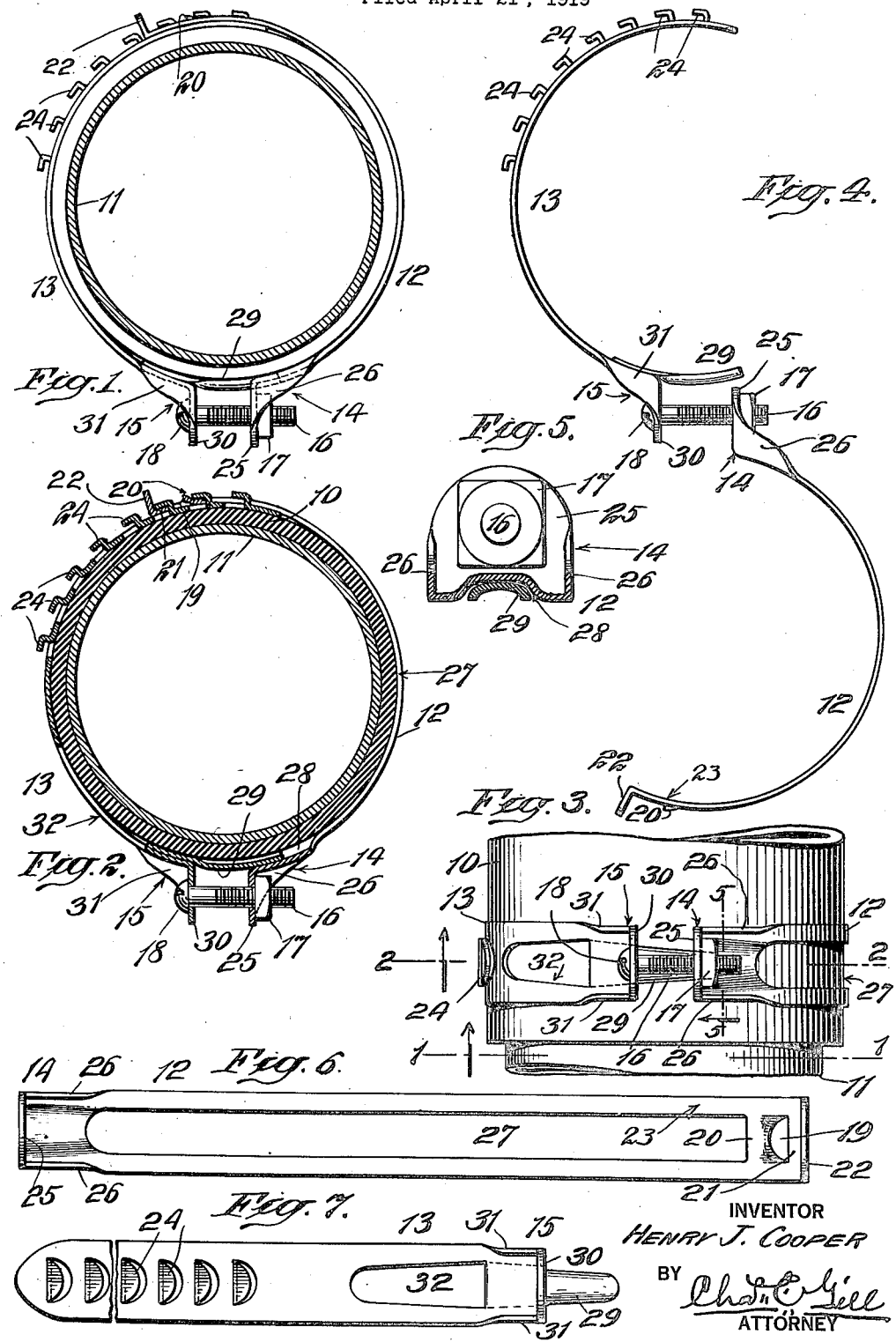
INVENTOR
HENRY J. COOPER
BY
ATTORNEY Patented Sept. 11, 1923.

1,467,708

UNITED STATES PATENT OFFICE.

HENRY J. COOPER, OF BROOKLYN, NEW YORK.

CLAMP.

Application filed April 21, 1919. Serial No. 291,610.

*To all whom it may concern:*

Be it known that I, HENRY J. COOPER, a citizen of Switzerland, and a resident of Brooklyn, in the county of Kings and State of New York, have invented certain new and useful Improvements in Clamps, of which the following is a specification.

The invention pertains more particularly to clamps of the character employed for binding a piece of hose onto a nipple or pipe, and the object of the invention is to provide a simple and inexpensive clamp capable of being conveniently, quickly and efficiently applied and also readily adaptable to different diameters of hose or other articles to which it may be applied.

One main purpose of my invention is to provide an efficient clamp which is inexpensive of manufacture and adjustable to varying diameters of hose or pipes.

The clamp of my invention, aside from the final securing screw and nut, comprises two main parti-cylindrical parts, each being integral, and the two parts being adjustable with relation to each other, so as to adapt the clamp to hose of varying diameters. The two main parts of the clamp are formed with integral heads or members to receive the securing screw and nut, and said parts are formed with means, independently of the said screw and nut, for connecting the same together around hose varying in diameter.

The invention will be fully understood from the detailed description hereinafter presented, reference being had to the accompanying drawings, in which:

Fig. 1 is a vertical section through a piece of pipe or a nipple and having a piece of hose bound thereon by the clamp of my invention, the section being on the dotted line 1—1 of Fig. 3;

Fig. 2 is a vertical section through the clamp of my invention, a piece of pipe and a piece of hose bound on said pipe by said clamp, the section being taken on the dotted line 2—2 of Fig. 3;

Fig. 3 is an elevation of the clamp of my invention shown applied to a piece of hose and a piece of piping, the hose and piping being partly broken away;

Fig. 4 is a side elevation of the clamp of my invention showing the two partly cylindrical members thereof as swiveled outwardly from each other preparatory to being applied to operative position without requiring the complete separation of said parts;

Fig. 5 is a transverse section through the end portion of one member of the clamp and a tongue on the other member thereof, taken on the dotted line 5—5 of Fig. 3;

Fig. 6 is a detached top view of one of the members of the clamp shown as straightened out, and Fig. 7 is a corresponding view of the other member of the clamp.

In the drawings, 10 designates a piece of hose with the clamp of my invention applied thereon and binding the same upon a piece of piping or a nipple 11, and the said clamp comprises two partly cylindrical members 12, 13, a head 14 formed integrally on one end of the member 12, a head 15 formed integrally on the adjacent end of the member 13, a screw 16 extending through said heads, and a nut 17 engaged by said screw and having a bearing against the head 14. The screw 16 will preferably have a slotted head 18, as usual, adapted to be engaged by an ordinary screw-driver or the like, and said head 18 engages the head 15 of the member 13.

The member 12 is formed from a strip of sheet metal and is of about the same width as the member 13, which is also of sheet metal, and said member 12 is formed at one end with the head 14 and at its other end with a recess 19, a transverse bar 20 and a transverse bar 21 having at its outer edge a right angular flange 22, which serves as a convenient means whereby the operator may draw the end 23 of the clamp member 12 along the member 13 until said end has reached the correct position at which its recess 19 and cross-bar 20 are to engage the hooks 24 on the member 13.

The head 14 of the member 12 is integral with said member and formed by bending at right angles a flange 25 to receive the screw 16 and afford a bearing for the nut 17, and by bending outwardly certain portions of the edges of the metal to form substantially triangular shaped flanges 26 which connect the flange 25 with the edges of the member 12, as clearly represented in the drawings. The flanges 26 increase the rigidity of the flange 25 and aid said flange in resisting the pressure of the nut 17. The member 12 is formed with an elongated slot 27 which extends from the cross-bar 20 to a point adjacent to the head 14, as shown in Fig. 6, and said slot is of sufficient width to straddle the hooks 24 and in addition has a length greater than the hooks 24 require, and this is for the purpose of increasing the efficiency of the member 12 in its binding action on the hose 10. When the clamp is tightly bound upon the hose 10, portions of the hose may swell into the exposed part of the slot 27, and in this way a more secure binding action is attained on the hose than would be possible if the extended portion of the slot 27 were omitted. Between the flanges 26 of the head 14, the member 12 is curved outwardly to form a longitudinal pocket 28 to receive a tongue 29 formed on the member 13.

The member 13, as well as the member 12, is flexible and capable of being conformed to the hose to which the clamp may be applied, and said member 13 has on one end the integral head 15 formed by bending at right angles a flange 30 to receive the head 18 of the screw 16, and by bending outwardly certain portions of the edges of the metal to form substantially triangular shaped flanges 31 which connect the flange 30 with the side edges of the member 13, as clearly shown in the drawings. The flanges 31 increase the rigidity of the flange 30 and aid said flange in resisting the pressure of the head 18 of the screw 16. Adjacent to the head 15 the member 13 is slotted, as at 32, and the material which formerly occupied the dimensions of the slot 32 is bent longitudinally of the member 13 to constitute a tongue 29, which projects beyond the head 15 and is adapted to enter the pocket 28 formed in the head end of the member 12, said tongue thus serving to span the space between the heads 14, 15 and afford for the clamp a continuous bearing entirely around the hose. The tongue 29 is integral with the member 13, having been slit and bent longitudinally thereof, and said tongue from the head 15 outwardly is convexed, as shown in Fig. 5, thereby leaving the concave portion, with its two side edges, to engage the hose, whereby firm gripping action is secured at said tongue. The opening 32 is beneficial, as is the slot 27 in the member 12, in affording a space into which the rubber of the hose may swell, and which therefore affords additional security in respect to obtaining a tight joint between the parts clamped together. The member 13 has struck from its longitudinal middle portion a series of lips 24 which serve as hooks for adjustably engaging the end 23 of the member 12. The lips or hooks 24 are uniformly spaced apart, and the series thereof extend throughout substantially from the opening 32 in the member 13 to the outer end thereof, so that a very wide range of adjustment to the diameter of the hose may be secured.

The members 12, 13 may be conveniently constructed and carried in stock while loosely connected together by the screw 16 and nut 17, and then when the clamp is to be applied to position said members may be turned outwardly from each other or to the condition shown in Fig. 4, when the member 13 may be applied to the hose and the other member 12 then swiveled on the screw 16 to position to be applied against the hose and also against the member 13, the member 13 being first applied to the hose and the member 12 immediately thereafter. On applying the members 13, 12 to the hose, said members will first loosely engage the hose, and thereupon the operator will take hold of the lip or flange 22 and draw the end 23 of the member 12 along the free end of the member 13 until said members have entered into reasonably close relation to the hose, whereupon he will cause the recess 19 and cross-bar 20 to engage the appropriate lips or hooks 24, and then with his left hand turn the clamp members on the hose until the screw 16 has appeared in convenient position for being tightened. After the clamp members have been conveniently positioned, the final binding action of the clamp against the hose may be secured by operating the screw 16 in the usual manner. On removing the clamp from the hose the operator will first loosen the screw 16 and then unhook the end 23 of the member 12 from the lips or hooks 24 of the member 13. I consider it desirable that the member 13 be applied on the hose with the left hand, and that the member 12 then be swiveled around with the use of the right hand and placed in engagement with the member 13, Fig. 4 showing the preparatory position of the clamp member for application to a hose. I also consider it desirable that the two members of the clamp be connected together by the screw and nut 17 in the manner I illustrate, so that the clamps may be carried in stock instead of in separate pieces to be assembled by the user. The primary assembly of the parts of the clamp is also a convenience to the user, and in the construction presented the parts of the clamp do not have to be dismembered or the screw 16 removed on applying the clamp to position. When the clamp is in position the projecting tongue 29 of the member 13 spans the space between the heads 14, 15 and enters the recess or pocket 28 formed in the underside of the member 12 adjacent to the head 14.

The clamp of my invention, aside from the screw 16 and nut 17, is mainly in two integral parts 12, 13, and these parts are of flexible sheet metal and easily assembled and applied to hose varying in diameter. The width of the lips or hooks 24 is such that they may extend through the slot 27 formed in the member 12 and receive in adjusted engagement the end 23 of the member 12.

What I claim as my invention and desire to secure by Letters-Patent, is:

1. A clamp of the character described, comprising two substantially co-extensive parti-cylindrical flexible sheet metal members forming the body-portion of the clamp and each defining less than a circle, opposed heads at adjacent ends of said members, means for acting on said heads for drawing the same toward each other and tightening the clamp upon the article to which it may be applied and which means serve to swivel said members together so that without detaching the parts said members may be turned outwardly from and finally inwardly to overlap each other, and interlocking means on said members at portions thereof removed from said heads for adjustably securing said members one on the other and adapting the clamp to articles varying in diameter, after which the final tightening of the clamp on the article is effected by the drawing of the aforesaid heads toward each other, each of said members defining more than a half circle so as to permit adequate overlapping of the ends thereof removed from said heads and the adjustment of said members with relation to the varying diameters of the articles to which the clamp may be applied.

2. A clamp of the character described, comprising two substantially co-extensive parti-cylindrical flexible sheet metal members forming the body-portion of the clamp and each defining less than a circle, opposed heads at adjacent ends of said members, means for acting on said heads for drawing the same toward each other and tightening the clamp upon the article to which it may be applied and which means serve to swivel said members together so that without detaching the parts said members may be turned outwardly from and finally inwardly to overlap each other, and interlocking means on said members at portions thereof removed from said heads for adjustably securing said members one on the other and adapting the clamp to articles varying in diameter, after which the final tightening of the clamp on the article is effected by the drawing of the aforesaid heads toward each other, each of said members defining more than a half circle so as to permit adequate overlapping of the ends thereof removed from said heads and the adjustment of said members with relation to the varying diameters of the articles to which the clamp may be applied, and one of said members comprising for said interlocking means a series of hooks and the other of said members a cross-bar adapted to engage any of said hooks; and said other member having an elongated slot to straddle all of said hooks so that the two members of the clamp may, where they overlap, lie closely one upon the other.

3. A clamp of the character described, comprising two substantially co-extensive parti-cylindrical flexible sheet metal members each defining less than a circle and together forming the body-portion of the clamp and having at adjacent end-portions and integral therewith opposed heads containing aligned apertures, a screw extending through said apertures and having a head engaging one of said heads and a nut engaging the other head, said screw and nut serving to connect said heads and as means for drawing them toward each other for tightening the clamp on the article to which it may be applied and also as means for swiveling said members together so that without detaching the parts said members may be turned outwardly from and finally inwardly to overlap each other, and interlocking means on said members at portions thereof removed from said heads for adjustably securing said members one on the other and adapting the clamp to articles varying in diameter, after which the final tightening of the clamp on the article is effected by the action of said screw in drawing said heads toward each other, each of said members defining more than a half circle so as to permit adequate overlapping of the ends thereof removed from said heads and the adjustment of said members with relation to the varying diameters of the articles to which the clamp may be applied.

4. A clamp of the character described, comprising two substantially co-extensive parti-cylindrical flexible sheet metal members each defining less than a circle and together forming the body-portion of the clamp and having at adjacent end-portions and integral therewith opposed heads containing aligned apertures, a screw extending through said apertures and having a head engaging one of said heads and a nut engaging the other head, said screw and nut serving to connect said heads and as means for drawing them toward each other for tightening the clamp on the article to which it may be applied and also as means for swiveling said members together so that without detaching the parts said members may be turned outwardly from and finally inwardly to overlap each other, and interlocking means on said members at portions thereof removed from said heads for adjustably securing said members one on the other and adapting the clamp to articles varying in diameter, after which the final tightening of the clamp on the article is effected by the action of said screw in drawing said heads toward each other, each of said members defining more than a half circle so as to permit adequate overlapping of the ends thereof removed from said heads and the adjustment of said members with relation to the varying diameters of the articles to which the clamp may be applied, and one of said members having adjacent to its head end a tongue slit therefrom and bent toward the other member to bridge the space between the heads on said members and the other of said members being formed with a pocket to receive the free end of said tongue.

Signed at New York city, in the county of New York, and State of New York, this 10th day of April A. D. 1919.

HENRY J. COOPER.

Witnesses:
ARTHUR MARION,
CHAS. C. GILL.